Jan. 16, 1962     H. A. PEZZOPANE     3,017,500
VEHICLE LAMP
Filed Aug. 14, 1958
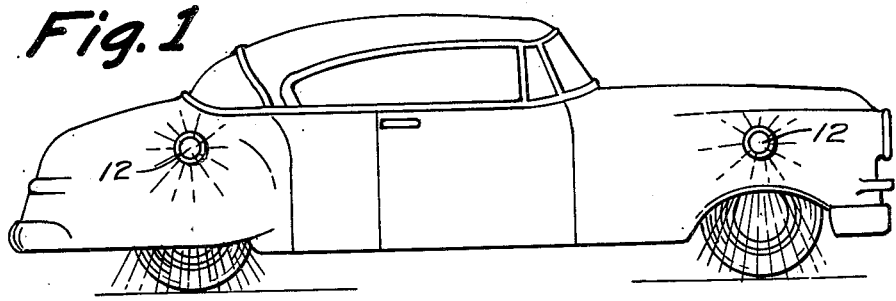
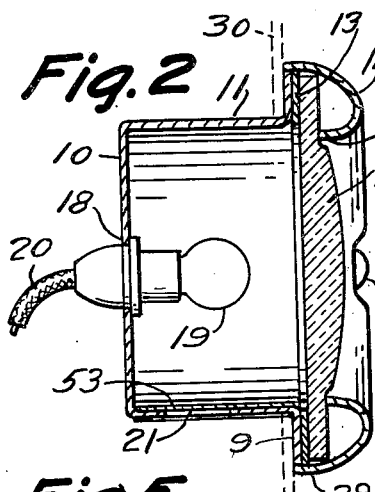
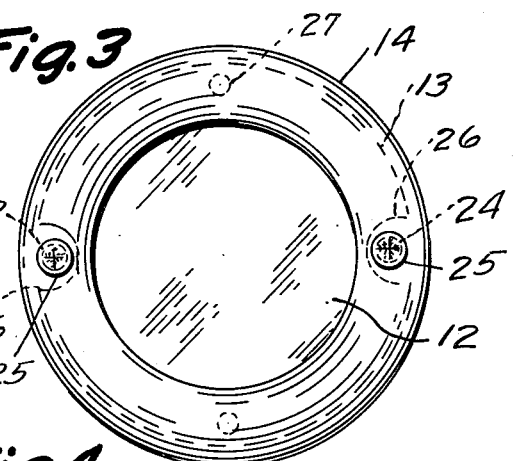
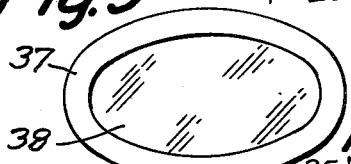
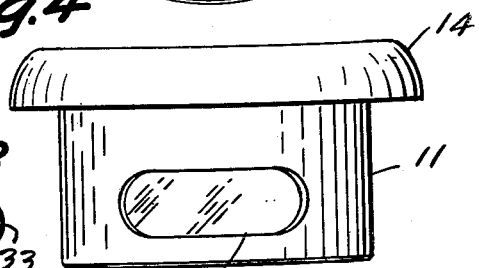
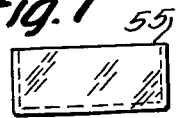
INVENTOR
*Herman A. Pezzopane*
BY *James Harrison Bowen*
ATTORNEY

United States Patent Office 3,017,500
Patented Jan. 16, 1962

3,017,500
VEHICLE LAMP
Herman A. Pezzopane, 9206 S. 52nd Ave., Oak Lawn, Ill.
Filed Aug. 14, 1958, Ser. No. 754,961
1 Claim. (Cl. 240—8.2)

This invention relates to illumination of the general class of trouble lights particularly as used in combination with wheels of motor vehicles, and in particular light casings mounted in openings in vertically disposed side walls of motor vehicles and positioned directly above the wheels of the vehicle whereby rays of light from light bulbs in the casings are directed downwardly and outwardly through elongated openings in lower sides of the casings to illuminate the outer surfaces of the wheels to facilitate removing and replacing tires or wheels of the vehicles.

The purpose of this invention is to provide lights for illuminating outer surfaces of wheels of motor vehicles in which the lights are permanently installed on the vehicles so that it is only necessary to press a button or close a switch to throw light on the wheels and to the sides of the vehicle.

Various types of lights have been provided for providing illumination for wheels of motor vehicles to facilitate changing tires, however, devices of this type are located in such positions and formed of such designs that the light rays are not directed to the nuts of the studs, and therefore, such devices are not used.

With these thoughts in mind this invention contemplates a trouble light including a small cup-shaped casing having a peripheral flange with a lens therein on the outer end, and with an opening in the lower side, wherein with the casing mounted in an opening in a side wall of a vehicle the lens shows from the side of the vehicle and light from the casing passes through the opening in the lower side thereof, illuminating the outer surface of a wheel below.

The object of this invention is, therefore, to provide means for constructing a light for a motor vehicle whereby rays of light are directed downwardly to illuminate a wheel below a vehicle body in which the light is mounted.

Another object of the invention is to provide a light for illuminating wheels of a motor vehicle in which the light is designed to be installed in a side wall of a motor vehicle in which the light may be installed by the average layman.

Another important object of the invention is to provide lights for illuminating wheels of a motor vehicle which may remain lighted while the vehicle is in operation.

A further object of the invention is to provide an emergency light for illuminating wheels of a motor vehicle in which the light facilitates gauging the distance between vehicles in passing and also in parking.

A still further object is to provide a trouble light for motor vehicles which illuminates the wheels of the vehicle, and which also facilitates backing in narrow driveways for parking.

And a still further object is to provide a light for illuminating wheels of a motor vehicle and which also spreads rays of light over the roadway at the sides of a vehicle in which the light is of simple and economical construction.

With these and other objects and advantages in view the invention embodies a cup-like casing having an annular flange on the open end and having a light opening in the lower side, a lens positioned against the flange, a gasket on the lens, and a rim extended around the edge of the lens.

Other features and advantages of the invention will appear from the following description taken in connection with the drawings, wherein:

FIGURE 1 is a side elevational view of a motor vehicle showing the four-way-safety-light in the fenders at the sides thereof.

FIGURE 2 is a vertical longitudinally disposed section through the light casing.

FIGURE 3 is a front elevational view of the casing.

FIGURE 4 is a bottom view looking upwardly toward the under side of the light casing showing the light opening therein.

FIGURE 5 is a view showing a modification wherein the casing is of an elliptical shape.

FIGURE 6 is a view showing a further modification wherein a diamond-shaped casing is provided.

FIGURE 7 is a view showing a transparent cup that may be used in the casing instead of using a lens on the ends of the casing.

FIGURE 8 is a view showing a modification wherein the rim of the casing is threaded on the casing.

Referring now to the drawing wherein like reference characters denote corresponding parts the four way safety light of this invention includes a cup-shaped casing or body having a base 10 with a cylindrical wall 11 and having a flange 9 extended from the edge of the wall opposite to the end on which the base is positioned, a lens 12 providing a cover for the open end of the casing, a gasket 13, and a rim 14.

The base 10 of the cup-like casing is provided with an opening 18 in which a light bulb 19 is mounted, and electric supply wires 20 extended from the opening to any suitable point on the ignition system of the vehicle on which the light is installed. The wall of the casing is also provided with an elongated opening or aperture 21, and the casing is mounted in the fender so that the opening 21 is in the lower side whereby rays of light passing through the opening pass to the outer surface of a wheel of the vehicle.

The rim 14 is provided with openings 22 and 24 in which metal screws 25 are positioned, and the metal screws extend through notches 26 in the gasket 13, and also through openings 27 in the flange 9 into the material of the vehicle whereby the light casing is secured in position on the vehicle body. The flange is provided with four of the openings 27 so that the casing may be turned through an angle of 90°, or to any suitable position.

With the parts assembled, as shown in FIGURE 2, the inner edge 28 of the rim 14 bears against the lens 12, and the outer edge 29 fits snugly against the outer surface of a bodywork panel of a vehicle, or fender 30. By this means a sealed installation is obtained, the casing being sealed by the gasket 13.

In the design shown in FIGURE 8 a casing 31, similar to the casing shown in FIGURE 2, is provided with threads 32 on the outer surface of the open end and a rim 33 is threaded on the casing securing a lens 34 against the end of the casing and providing a clamp securing a fender 35 against a ring 36 threaded on the casing. It will be understood that the casing of the light may be secured in an opening in an outer wall of a motor vehicle by any suitable means.

It will be understood that the casing may be of any suitable shape or design, and in FIGURE 5 a casing is provided with an oval or elliptical-shaped rim 37 having a similarly shaped lens 38, and in FIGURE 6 the device is provided with a diamond-shaped rim 39 and a similar shaped lens 40.

Operation

The 4-way safety light of this invention which: facilitates changing tires by illuminating the tires and wheels, provides light at the sides of vehicles to facilitate passing, facilitates backing in driveways, and also provides light for driving in fog; is mounted in openings in the outer walls of the vehicles, and is connected to the ignition system of the vehicle, or provided with an independent switch or circuit as desired.

The cup-shape casing is provided with a liner or arcuate plate 53 of transparent material forming a closure for the opening 21, or the liner may be replaced with a glass cup 55, shown in FIGURE 9.

The lens 12 may be red or of an amber color, and the casing and rim may also be of a rectangular shape.

What is claimed is:

In a motor vehicle having a vertical bodywork panel having an opening therein and said opening being aligned with a wheel of the vehicle, the combination which comprises an electric lamp for use on said vehicle comprising a casing including a cup-shaped body having a base with a continuous wall extended from the periphery, and having at its open end an annular outwardly extended flange, said cup-shaped body being positioned in the opening of said vertical bodywork panel and said continuous wall having an opening in the lower side thereof, a lens on the open end of the casing and providing a closure therefor, a rim extended from the periphery of the flange and overlapping the lens for retaining the lens in position on the casing, means for retaining the rim in position on the flange, and a transparent arcuate plate positioned against the inner surface of said continuous wall and covering the opening therein, said opening in the continuous wall of the body being positioned in the lower side of the body and substantially midway between the base and flange, whereby with the casing in the opening of the vertical bodywork panel at the side of vehicle body the lens is exposed at one side of the panel and illumination is provided on the opposite side of the panel through said opening in the lower side of the wall of the casing, whereby with the opening of the bodywork panel in alignment with the wheel of the vehicle light is projected from a common light bulb from the side of the vehicle and also over the wheel of the vehicle with which the opening in the bodywork panel is aligned.

References Cited in the file of this patent
UNITED STATES PATENTS

| | | |
|---|---|---|
| 1,145,087 | Shaw | July 6, 1915 |
| 1,225,472 | Morin | May 8, 1917 |
| 1,484,819 | Dublin | Feb. 26, 1924 |
| 1,551,720 | Williamson | Sept. 1, 1925 |
| 1,613,841 | Monson | Jan. 11, 1927 |
| 2,221,904 | Abramson et al. | Nov. 19, 1940 |
| 2,557,872 | Holland | June 19, 1951 |
| 2,640,910 | Talley | June 2, 1953 |
| 2,735,489 | Fowler | Feb. 21, 1956 |
| 2,786,935 | Geary | Mar. 26, 1957 |